(12) United States Patent
Cha et al.

(10) Patent No.: US 9,783,121 B2
(45) Date of Patent: Oct. 10, 2017

(54) BICYCLE CARRIER APPARATUS FOR VEHICLE

(71) Applicant: Hyundai Motor Company, Seoul (KR)

(72) Inventors: Dong Eun Cha, Suwon-si (KR); Jin Young Yoon, Gimpo-si (KR); Seung Mok Lee, Osan-si (KR); Hyun Gyung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 204 days.

(21) Appl. No.: 14/816,845

(22) Filed: Aug. 3, 2015

(65) Prior Publication Data

US 2016/0297371 A1 Oct. 13, 2016

(30) Foreign Application Priority Data

Apr. 7, 2015 (KR) .................. 10-2015-0048903

(51) Int. Cl.
   *B60R 9/10* (2006.01)
   *B60R 9/06* (2006.01)
(52) U.S. Cl.
   CPC .............. *B60R 9/10* (2013.01); *B60R 9/06* (2013.01); *B60R 9/065* (2013.01)
(58) Field of Classification Search
   CPC ................................................. Y10S 224/924
   USPC ........ 224/432, 484–486, 497–498, 500, 501, 224/314, 42.34, 924; 220/666
   See application file for complete search history.

(56) References Cited

U.S. PATENT DOCUMENTS 1,482,770 A    2/1924  Terrell
1,849,046 A *  3/1932  Arndt ...................... B60R 9/065
                                                     190/22
1,904,114 A *  4/1933  Ambrosius ............... B60R 9/06
                                                     224/500
1,941,375 A * 12/1933  Wildman .................. A45C 5/04
                                                     190/1
3,176,903 A    4/1965  Farley
5,445,300 A    8/1995  Eipper et al.
6,145,720 A * 11/2000  Comeau .................. B60R 9/065
                                                     224/282
7,121,597 B2  10/2006  Chuang
(Continued)

FOREIGN PATENT DOCUMENTS

EP     2 570 305 B1    11/2010
JP     2014-97387 A     5/2014
(Continued)

OTHER PUBLICATIONS

EP Publication #0041889, Application #EP81400878, Inventor Hamel Robert Jacques.*

*Primary Examiner* — Adam Waggenspack
(74) *Attorney, Agent, or Firm* — Morgan, Lewis & Bockius LLP (57) ABSTRACT

A bicycle carrier apparatus for a vehicle may include a slide carrier configured to slidably move in forward and backward directions on a bumper back beam to be drawn out or accommodated, an extended support installed on the slide carrier to be extended and spread in both side directions and formed to carry a bicycle thereon, and an expandable box seated on the extended support and carried on the slide carrier, to have an accommodation space formed therein, and to be expanded or contracted in a spreading direction of the extended support when the extended support is extended and spread.

11 Claims, 7 Drawing Sheets

(56) References Cited

U.S. PATENT DOCUMENTS

| | | |
|---|---|---|
| 7,806,307 B2 | 10/2010 | Bergerhoff et al. |
| 7,854,358 B2 | 12/2010 | Bergerhoff et al. |
| 7,857,180 B2 | 12/2010 | Bergerhoff et al. |
| 7,909,213 B2 * | 3/2011 | Bergerhoff ............... B60R 9/10 224/197 |
| 2006/0266754 A1 * | 11/2006 | Carmona ............ B65D 21/086 220/666 |
| 2007/0102465 A1 | 5/2007 | Wezyk et al. |
| 2008/0006665 A1 | 1/2008 | Bergerhoff et al. |
| 2008/0006667 A1 | 1/2008 | Bergerhoff et al. |
| 2008/0142559 A1 | 6/2008 | Lim et al. |
| 2011/0108592 A1 | 5/2011 | Lee et al. |
| 2012/0024923 A1 * | 2/2012 | Cha ........................ B60R 9/06 224/533 |
| 2012/0205413 A1 | 8/2012 | Degenstein et al. |
| 2013/0182454 A1 | 7/2013 | Hofmann et al. |
| 2015/0321620 A1 | 11/2015 | Lungershausen et al. |
| 2016/0052457 A1 | 2/2016 | Cha et al. |
| 2016/0052459 A1 | 2/2016 | Cha et al. |
| 2016/0096482 A1 | 4/2016 | Cha et al. |
| 2016/0096483 A1 | 4/2016 | Cha et al. |
| 2016/0152190 A1 | 6/2016 | Lee et al. |

FOREIGN PATENT DOCUMENTS

| | | |
|---|---|---|
| KR | 10-2007-0026191 A | 3/2007 |
| KR | 10-2009-0003555 A | 1/2009 |
| KR | 10-2011-0034733 A | 4/2011 |
| KR | 10-2011-0035378 A | 4/2011 |
| KR | 10-2011-0050162 A | 5/2011 |
| KR | 10-1040088 B1 | 6/2011 |
| KR | 10-2014-0041647 A | 4/2014 |

* cited by examiner

BICYCLE CARRIER APPARATUS FOR VEHICLE

CROSS-REFERENCE(S) TO RELATED APPLICATIONS

The present application claims priority to Korean Patent Application No. 10-2015-0048903, filed Apr. 7, 2015, the entire contents of which is incorporated herein for all purposes by this reference.

BACKGROUND OF THE INVENTION

Field of the Invention

Various embodiments of the present invention relate to a bicycle carrier apparatus for a vehicle, which is installed on a rear bumper side of the vehicle to carry a bicycle and a baggage thereon.

Description of Related Art

Recently, as a bicycle is used as means for leisure activities, the bicycle is carried on a vehicle to move the bicycle to a biking road or to the neighborhood of a mountain.

However, since the bicycle generally has a large volume, it is difficult to carry the bicycle in the vehicle even using a trunk or a back seat compartment of the vehicle.

To solve this problem, various schemes for carrying a bicycle out of the vehicle have been proposed. However, in the case of carrying a bicycle through fixing the bicycle to a loop panel of the vehicle, the carrying work itself causes great inconvenience, and the height of the vehicle is increased to cause a safety accident when the vehicle enters into a tunnel or a building.

In the case of carrying a bicycle at a rear end of a tail gate of the vehicle, it is necessary to install a separate carrier apparatus on the tail gate to cause inconvenience. Further, even normal times when the bicycle is not carried, a carrier apparatus is exposed to an outside to hinder the vehicle exterior design.

In addition, in the case where it is necessary to carry the bicycle on the vehicle, it is required to install the carrier apparatus, while in the case where it is not necessary to carry the bicycle, it is required to take away the carrier apparatus to cause lack of convenience in use.

Further, since the carrier apparatus in the related art is optimized to stably carry the bicycle, it is not possible to carry other objects. Even if other objects can be carried through the carrier apparatus, it is not possible to accommodate the objects having various sizes, and it is difficult to safely carry the objects to cause a secession of the objects.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bicycle carrier, which is installed on a rear bumper back beam of a vehicle in a manner that it is not exposed to an outside normal times, but is drawn from the bumper back beam to enable a bicycle to be carried thereon if it is required to carry the bicycle, so that the exterior design can be maintained and convenience can be improved.

Further, various aspects of the present invention are directed to providing a bicycle carrier apparatus for a vehicle, which can stably carry objects having various volumes to match their sizes in addition to carriage of a bicycle.

According to various aspects of the present invention, a bicycle carrier apparatus for a vehicle may include a slide carrier configured to slidably move in forward and backward directions on a bumper back beam to be drawn out or accommodated, an extended support installed on the slide carrier to be extended and spread in both side directions and formed to carry a bicycle thereon, and an expandable box seated on the extended support and carried on the slide carrier, to have an accommodation space formed therein, and to be expanded or contracted in a spreading direction of the extended support when the extended support is extended and spread.

A guide rail may be provided on the bumper back beam to be extended in the forward and backward directions, and the slide carrier may include a panel portion and a side rail slidably connected to the guide rail to be drawn out or accommodated along the guide rail.

An extended rail that is extended to cross a side rail may be fixed to the slide carrier, and the extended support may be slidably connected to the extended rail to slidably move in a side direction along the extended rail.

The expandable box may be formed to have a wrinkle folding structure to be expanded or contracted.

The expandable box may have the accommodation space formed therein, and may include a housing having an open upper surface and a cover configured to cover the open upper surface of the housing, and a central portion of the housing and a central portion of the cover may have wrinkle folding structures formed with a same width.

A fixing slider, which is extended in a direction in which the wrinkle folding structure is expanded or contracted and is fixed to both ends of the cover, may be provided on an upper surface of the cover, and the fixing slider may have a length that is variable in the same direction as the direction in which the cover is expanded or contracted.

The fixing slider may include a slide pipe connected and fixed to a first end of the upper surface of the cover and formed in a hollow pipe shape, and a slide bar which may be slidably inserted into a hollow portion of the slide pipe and may be connected and fixed to a second end of the upper surface of the cover.

A fixing bar may be rotatably installed on the slide carrier, and the fixing bar may be provided with a clamp mechanism which is connected to the fixing bar and the slide pipe of the fixing slider.

The extended support may be provided with a strap having a first fixed end and configured to fix a wheel of a bicycle and a fixing device for fixing a second end of the strap.

Fixing holes may be symmetrically formed on a lower end surface of the expandable box, and the expandable box may be fixedly positioned on the extended support in a manner that the strap, which is inserted into the accommodation space of the expandable box through one of the fixing holes, passes through other of the fixing holes and is fixed to the fixing device.

A support bar may be provided between the symmetrical fixing holes on the lower end surface of the expandable box, and the strap that is inserted into the fixing hole may surround the support bar.

According to the bicycle carrier apparatus for a vehicle having the above-described configuration, since the bicycle carrier is installed on the rear bumper back beam of the vehicle in a manner that the bicycle carrier is not exposed to the outside normal times, but is automatically drawn from the bumper back beam to enable the bicycle to be carried thereon when the bicycle is carried, the exterior design can be maintained and convenience can be improved.

Further, objects having various volumes can be stably carried to match their sizes in addition to carriage of the bicycle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
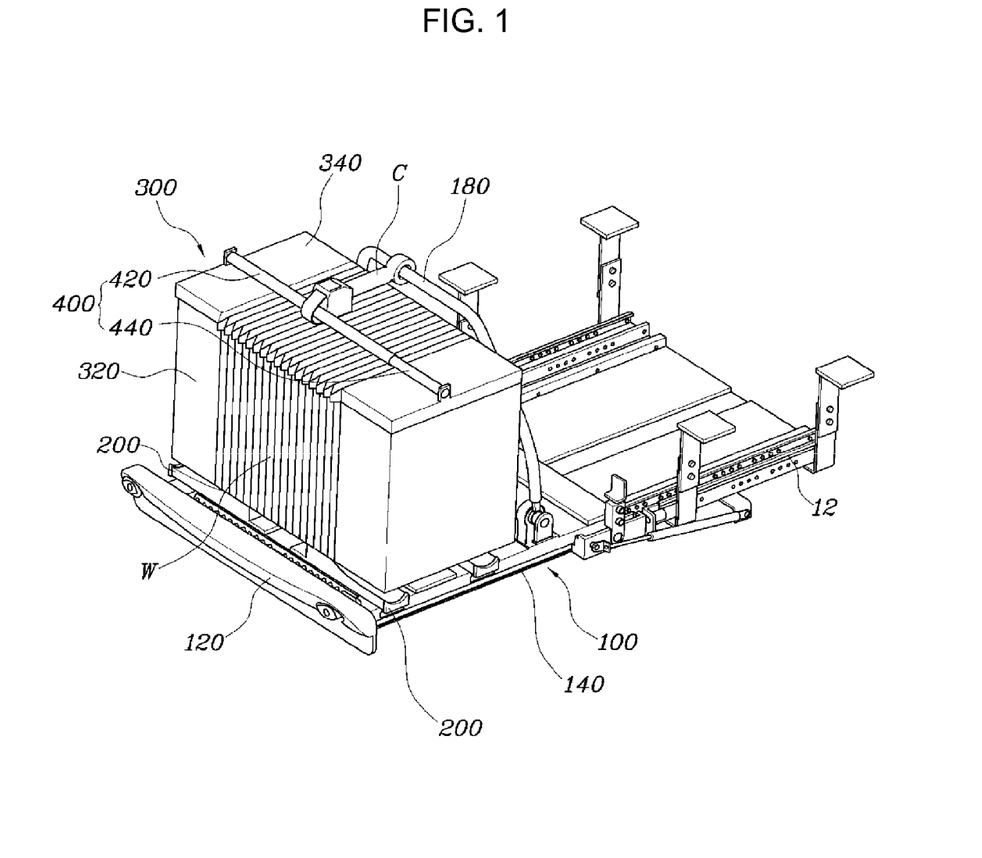
FIG. 1 is a perspective view of an exemplary bicycle carrier apparatus for a vehicle in accordance with the present invention.
Figure 2:
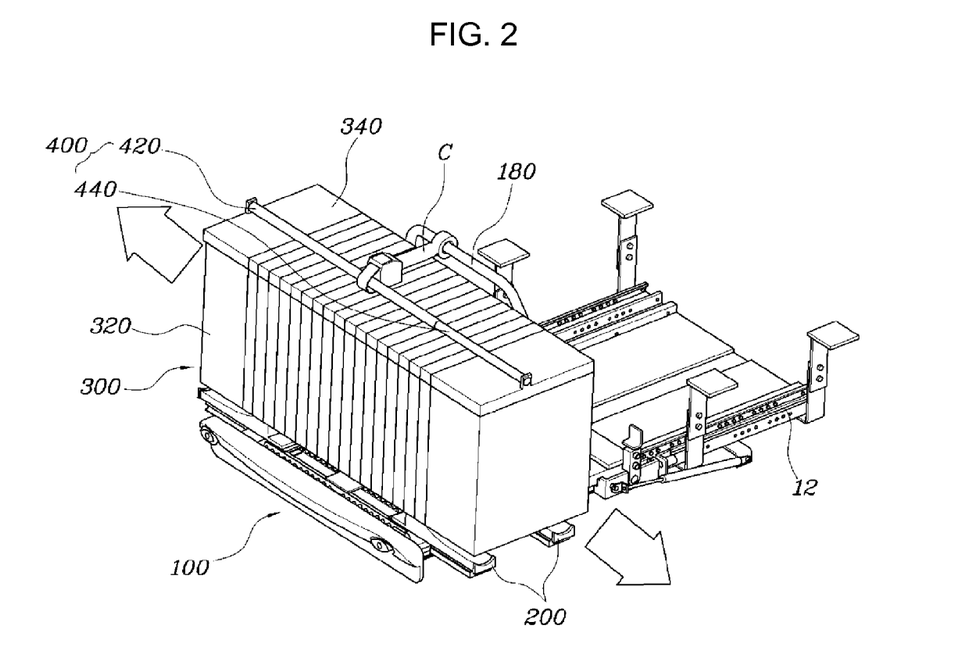
FIG. 2 is a perspective view of the exemplary bicycle carrier apparatus illustrated in FIG. 1 in an operation state.
Figure 3:
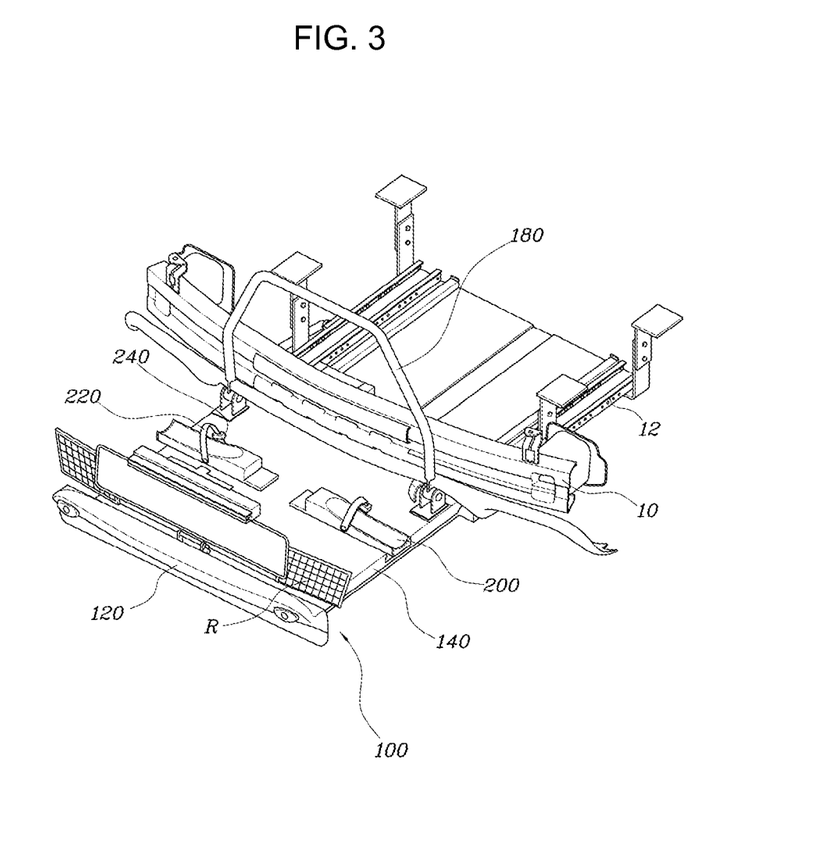
FIG. 3 is a perspective view of an exemplary bicycle carrier apparatus for a vehicle in accordance with the present invention.
Figure 4:
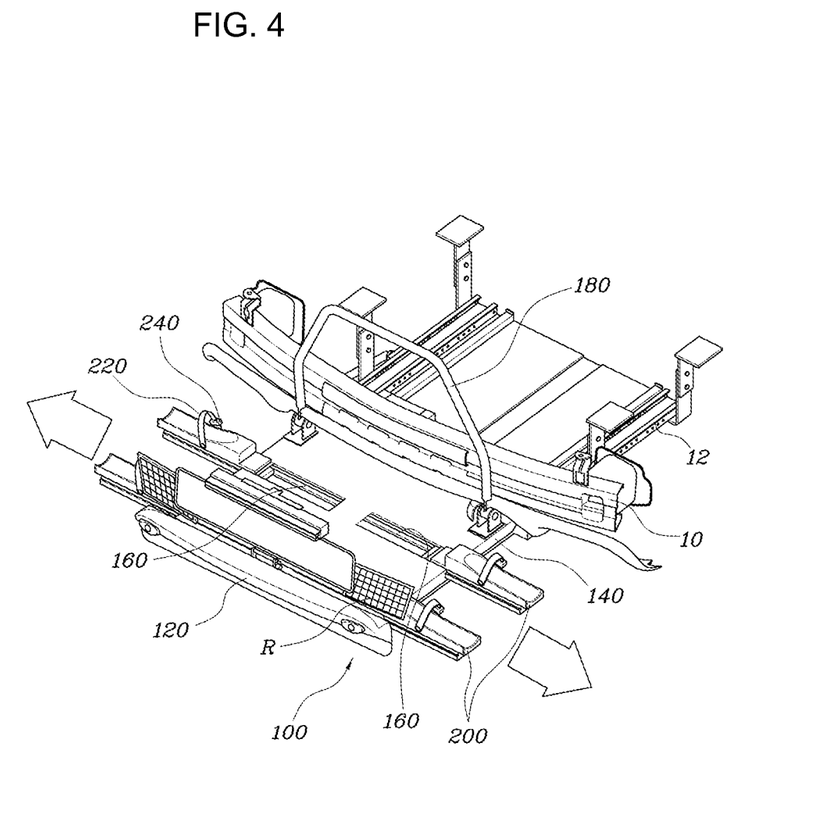
FIG. 4 is a perspective view of the exemplary bicycle carrier apparatus illustrated in FIG. 3 in an operation state.
Figure 5:
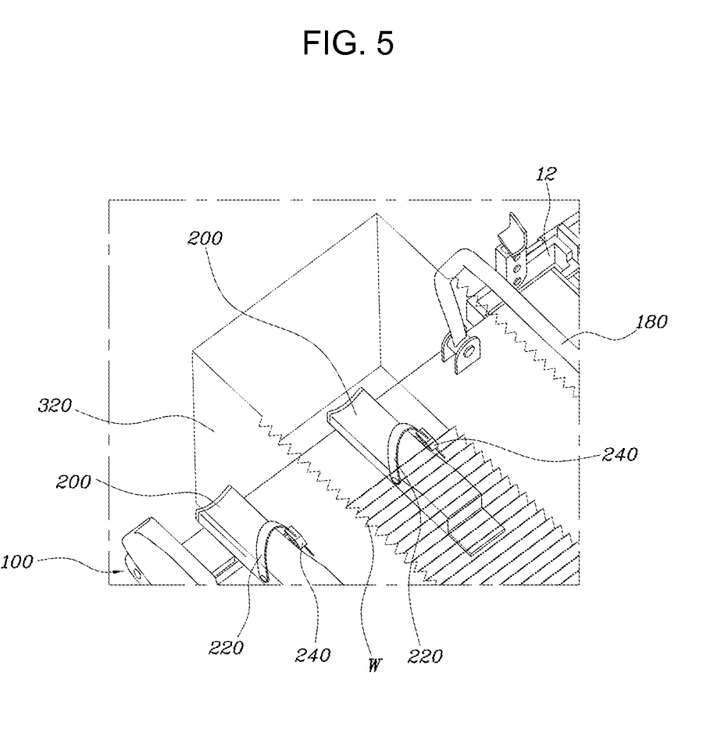
FIG. 5, FIG. 6, and FIG. 7 are views explaining a bicycle carrier apparatus in accordance with the present invention.
Figure 6:
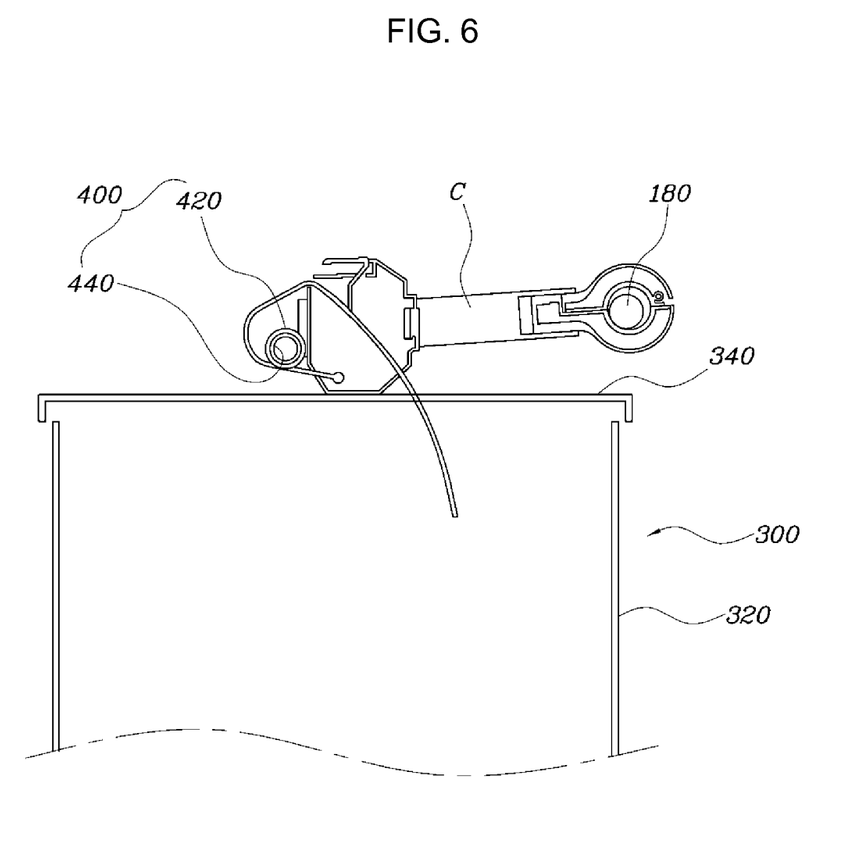
Figure 7:
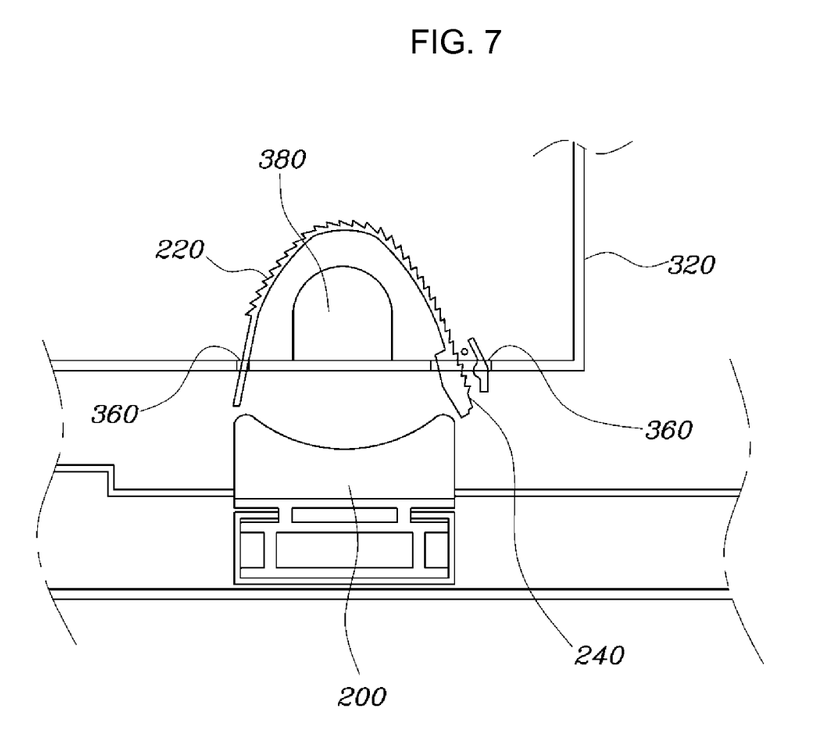

FIG. 1 is a perspective view of a bicycle carrier apparatus for a vehicle in accordance with various embodiments of the present invention, and FIG. 2 is a perspective view of the bicycle carrier apparatus illustrated in FIG. 1 in an operation state. FIG. 3 is a perspective view of a bicycle carrier apparatus for a vehicle in accordance with various embodiments of the present invention, and FIG. 4 is a perspective view of the bicycle carrier apparatus illustrated in FIG. 3 in an operation state. FIG. 5 to FIG. 7 are views explaining a bicycle carrier apparatus in accordance with the present invention.

As illustrated in FIG. 1 and FIG. 2, a bicycle carrier apparatus for a vehicle in accordance with the present invention includes a slide carrier 100 configured to slidably move in forward and backward directions on a bumper back beam 10 to be drawn out or accommodated, an extended support 200 installed on the slide carrier 100 to be extended and spread in both side directions and formed to carry a bicycle thereon, and an expandable box 300 configured to be seated on the extended support 200 and to be carried on the slide carrier 100, to have an accommodation space formed therein, and to be expanded or contracted in a spreading direction of the extended support 200 when the extended support 200 is extended and spread.

As described above, the bicycle carrier apparatus for a vehicle in accordance with the present invention includes the slide carrier 100 that slidably moves on the bumper back beam 10, and the extended support 200 that is installed on the slide carrier 100 to be extended and spread and moves in both side directions to match the size of the bicycle. Through this, the slide carrier 100 is accommodated in the bumper back beam 10 in the rear of the vehicle in a manner that the slide carrier 100 is not exposed to an outside normal times, but is drawn from the bumper back beam 10 to enable the bicycle to be carried thereon if it is necessary to carry the bicycle. Here, a pair of the extended supports 200 may be provided to be extended and spread in opposite directions to each other. Accordingly, the extended supports 200 may be spaced apart from each other when they are extended and spread, and thus the distance between them can be adjusted to match the size of the bicycle.

The bicycle carrier apparatus for a vehicle in accordance with the present invention further includes the expandable box 300 so that not only the bicycle but also objects having various volumes can be carried through the bicycle carrier. The expandable box 300 is configured to be seated on the extended support 200 and to be expanded or contracted in the same direction as the direction in which the extended support 200 is extended or returned when the extended support 200 is extended and spread.

As described above, the expandable box 300 is configured to be expanded or contracted so as to match the extending operation of the extended support 200. Accordingly, in the case of accommodating a small object in the expandable box 300, the extended support 200 is kept in an initial state, whereas in the case of accommodating a large object in the expandable box 300, the expandable box 300 is expanded through the extending operation of the extended support 200, and thus the large object can be carried in the accommodation space of the expandable box 300.

That is, in accordance with the present invention, the expandable box 300 is provided to carry not only the bicycle but also the objects having various sizes through the bicycle carrier that is configured to be drawn out from or accommodated in the bumper back beam 10. Since the expandable box 300 is expanded or contracted in accordance with the extending operation of the extended support 200, the objects having various sizes can be easily carried in the expandable box 300.

Specifically, as illustrated in FIG. 3 and FIG. 4, a guide rail 12 is provided on the bumper back beam 10 to be extended in the forward and backward directions, and the slide carrier 100 includes a panel portion 120 and a side rail 140 slidably connected to the guide rail 12 to be drawn out or accommodated along the guide rail 12.

That is, the slide carrier 100 is provided so that the side rail 140 is movable along the guide rail 12 that is fixedly installed on the bumper back beam 10. Here, a separate driving motor (not illustrated) that is connected to the guide rail 12 is provided on the slide carrier 100, and when the driving motor operates in a state where the driving motor comes in rolling contact with the guide rail 12, the slide carrier 100 can move along the guide rail 12. For this, a pinion structure is applied to the driving motor (not illustrated), and a rack structure is applied to the guide rail 12, so that the driving motor (not illustrated) and the guide rail 12 may be connected to each other as rack and pinion structures. The operation of the driving motor may be controlled through a user's remote controller.

Further, a lamp device R may be provided on the panel portion 120 of the slide carrier 100. The lamp device R may be turned on to warn a rear-side vehicle of the drawn state of the slide carrier 100.

On the other hand, an extended rail 160 that is extended to cross the side rail 140 may be fixed to the slide carrier 100, and the extended support 200 may be slidably connected to the extended rail 160 to slidably move in a side direction along the extended rail 160.

That is, as illustrated in FIG. 4, on the slide carrier 100, the extended rail 160 is provided to cross the slide carrier in the side direction, and the extended support 200 is connected to the extended rail 160 to slidably move along the extended rail 160. A pair of extended supports 200 may be configured to be spread in both side directions, and thus may be set to match the width of the bicycle.

On the other hand, as illustrated in FIG. 5, the expandable box 300 may be formed to have a wrinkle folding structure w to be expanded or contracted. That is, in the case where the extended support 200 is in an initial position, the expandable box 300 is kept in a folded state, whereas in the case where the extended support 200 is extended and spread, the wrinkle of the expandable box 300 is unfolded. Accordingly, the expandable box 300 is expanded to increase the width thereof.

Specifically, as shown in FIG. 1 and FIG. 2, the expandable box 300 may have the accommodation space formed therein and include a housing 320 having an open upper surface and a cover 340 configured to cover the open upper surface of the housing 320. The central portion of the housing 320 and the central portion of the cover 340 may have wrinkle folding structures formed with the same width.

As described above, the expandable box 300 is composed of the housing 320 and the cover 340, and the accommodation space is formed inside the housing 320 to accommodate an object. The cover 340 covers the open upper surface of the housing 320 to prevent the object that is carried in the housing 320 from separating from the housing 320. The housing 320 and the cover 340 may adopt various locking means, such as a hook device and a latch device, to prevent the cover 340 that covers the housing 320 from separating from the housing 320.

In particular, the central portion of the housing 320 and the central portion of the cover 340 may adopt wrinkle folding structures w formed with the same width. As the extended support 200 is extended and spread in a state where the housing 320 is covered by the cover 340, the housing 320 and the cover 340 are expanded or contracted with the same length.

On the other hand, as illustrated in FIG. 6, a fixing slider 400, which is extended in a direction in which the wrinkle folding structure w is expanded or contracted and is fixed to both ends of the cover 340, may be provided on an upper surface of the cover 340, and the fixing slider 400 may be configured to have a length that is variable in the same direction as the direction in which the cover 340 is expanded or contracted.

The fixing slider 400 as described above may include a slide pipe 420 which is connected and fixed to one end of the upper surface of the cover 340 and is formed in a hollow pipe shape and a slide bar 440 which is slidably inserted into a hollow portion of the slide pipe 420 and is connected and fixed to the other end of the upper surface of the cover 340.

That is, the fixing slide includes the slide pipe 420 and the slide bar 440 that slidably moves in the hollow portion of the slide pipe 420. The cover 340 and the housing 320 are expanded or contracted through the wrinkle folding structure w, and in association with this, the slide bar 440 moves for the same length in the slide pipe 420.

In particular, a fixing bar 180 may be rotatably installed on the slide carrier 100, and the fixing bar 180 may be provided with a clamp mechanism c which is connected to the fixing bar 180 and the slide pipe 420 of the fixing slider 400. Through this, since the fixing bar 180 that is installed on the slide carrier 100 and the fixing slider 400 are connected through the clamp mechanism c, the cover 340 is connected to the fixing bar 180 through the clamp mechanism c, and thus the expandable box 300 is fixed in the forward and backward directions to be in a stably seated state.

Further, since the clamp mechanism c is connected to the slide pipe 420 of which the movement is limited on the fixing slider 400, the expandable box 300 that is connected to the fixing bar 180 through the clamp mechanism c can be stably fixed in the forward and backward directions.

As the clamp mechanism c as described above, various known clamp mechanisms c for fixing a bicycle may be adopted.

On the other hand, the extended support 200 may be provided with a strap 220 having one fixed end and configured to fix a wheel of a bicycle and a fixing device 240 for fixing the other end of the strap 220.

That is, on the extended support 200, the strap 220 is provided to surround and fixe the wheel of the bicycle that is seated on the extended support 200. Since the strap 220 surrounds the wheel of the bicycle and then is fixed to the fixing device 240, the bicycle that is seated on the extended support 200 can be fixed. Here, the fixing device 240 may be a buckle.

Particularly, in accordance with the present invention, the expandable box 300 is provided on the extended support 200 to carry not only the bicycle but also the objects having various sizes, and in this case, the expandable box 300 is seated on the extended support 200 with its position fixed.

For this, as illustrated in FIG. 7, fixing holes 360 may be symmetrically formed on a lower end surface of the expandable box 300, and the expandable box 300 may be fixedly positioned on the extended support 200 in a manner that the strap 220, which is inserted into the inner space of the expandable box 300 through one of the fixing holes 360, passes through the other of the fixing holes 360 and is fixed to the fixing device 240.

As described above, since the fixing holes 360 are formed on the lower end surface of the expandable box 300, the strap 220 that is installed on the extended support 200 is inserted into the accommodation space of the expandable box 300 through the fixing hole 360, and the strap 220 that is inserted into the accommodation space passes through the other fixing hole 360 and is fixed to the fixing device 240. Accordingly, the expandable box 300 that is seated on the extended support 200 is locked on the strap 220, and thus movement of the expandable box 300 in the forward, backward, upward, and downward directions is prevented.

Preferably, a support bar 380 is provided between the symmetrical fixing holes 360 on the lower end surface of the expandable box 300, and the strap 220 that is inserted into the fixing hole 360 surrounds the support bar 380.

Here, the support bar 380 has the same structure as the structure of the fixing slider 400 as described above, and is configured so that its length is varied in association with the expanding or contracting operation of the expandable box 300. By providing the support bar 380 that is extended in both side directions between the fixing holes 360 of the expandable box 300, the strap 220 that is installed on the extended support 200 is inserted into the accommodation space of the expandable box 300 through the fixing hole 360 and then surrounds and fixes the strap 220. Accordingly, the expandable box 300 can be fixed to the extended support 200 by stronger fixing force.

As described above, in accordance with the present invention, the slide carrier 100 is configured to slidably move in the forward and backward directions on the bumper back beam 10 to be drawn out or accommodated, and the extended support 200 is installed on the slide carrier 100 to be extended and spread in both side directions to carry the bicycle thereon.

Particularly, in accordance with the present invention, the expandable box 300, which is configured to be seated on the extended support 200 to carry an object, is provided to be expanded or contracted in association with the extending and spreading operation, and thus objects having various sizes can be easily carried.

In addition, since the fixing holes 360 are formed on the lower end surface of the expandable box 300, and the strap 220, which is inserted through the fixing hole 360 and surrounds and fixes the lower end surface of the expandable box 300, is provided, the lower end portion of the expandable box 300 is firmly fixed by the strap 220 of the extended support 200. In addition, the fixing slider 400, which is extended in the same direction as the direction in which the expandable box 300 is expanded or contracted and has a variable length, is provided, and the fixing slider 400 is connected to the fixing bar 180 that is installed on the slide carrier 100 through the clamp mechanism c to limit the movement of the expandable box 300.

As described above, the fixing slider 400 is fixedly connected to the fixing bar 180 that is installed on the slide carrier 100 on the upper side of the expandable box 300, and the strap 220 of the extended support 200 is inserted through the fixing hole 360 and surrounds and fixes the lower end surface of the expandable box 300. Accordingly, the expandable box 300 can be firmly fixed to the slide carrier 100 in a state where the expandable box 300 is seated on the extended support 200.

Through this, even if the vehicle travels in a state where the expandable box 300 is carried on the bicycle carrier, the expandable box 300 is completely prevented from separating from the bicycle carrier, and thus the carried object can be stably moved.

As described above, since the fixing holes 360 are formed on the lower end surface of the expandable box 300, the strap 220 that is installed on the extended support 200 is inserted into the accommodation space of the expandable box 300 through the fixing hole 360, and the strap 220 that is inserted into the accommodation space passes through the other fixing hole 360 and is fixed to the fixing device 240. Accordingly, the expandable box 300 that is seated on the extended support 200 is locked on the strap 220, and thus movement of the expandable box 300 in the forward, backward, upward, and downward directions is prevented.

According to the bicycle carrier apparatus for a vehicle having the above-described configuration, since the bicycle carrier is installed on the rear bumper back beam 10 of the vehicle in a manner that the bicycle carrier is not exposed to the outside normal times, but is automatically drawn from the bumper back beam 10 to enable the bicycle to be carried thereon when the bicycle is carried, the exterior design can be maintained and convenience can be improved.

Further, objects having various volumes can be stably carried to match their sizes in addition to carriage of the bicycle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier apparatus for a vehicle comprising: a slide carrier configured to slidably move in forward and backward directions on a bumper back beam to be drawn out of or accommodated inside of the vehicle; a pair of extended supports installed on the slide carrier to be extended and retracted in both side directions and including a fastening structure for securing a bicycle to be carried on the extended supports; and an expandable box having an accommodation space formed therein, the box seated on both extended supports and carried on the slide carrier such that the box is expanded or contracted in the spreading direction of each extended support when that extended support is extended and retracted, respectively.

2. The bicycle carrier apparatus of claim 1, wherein a guide rail is provided on the bumper back beam to be extended in the forward and backward directions, and the slide carrier comprises a panel portion and a side rail slidably connected to the guide rail to be drawn out or accommodated along the guide rail.

3. The bicycle carrier apparatus of claim 2, wherein an extended rail that is extended to cross a side rail is fixed to the slide carrier, and the extended supports are slidably connected to the extended rail to slidably move in a side direction along the extended rail.

4. The bicycle carrier apparatus of claim 1, wherein the expandable box is formed to have a wrinkle folding structure to be expanded or contracted.

5. The bicycle carrier apparatus of claim 1, wherein the expandable box has the accommodation space formed therein, and comprises a housing having an open upper surface and a cover configured to cover the open upper surface of the housing, and     a central portion of the housing and a central portion of the cover have wrinkle folding structures formed with a same width.

6. The bicycle carrier apparatus of claim 5, wherein a fixing slider, which is extended in a direction in which the wrinkle folding structure is expanded or contracted and is fixed to both ends of the cover, is provided on an upper surface of the cover, and     the fixing slider has a length that is variable in a same direction as the direction in which the cover is expanded or contracted.

7. The bicycle carrier apparatus of claim 6, wherein the fixing slider comprises:

a slide pipe connected and fixed to a first end of the upper surface of the cover and formed in a hollow pipe shape; and     a slide bar which is slidably inserted into a hollow portion of the slide pipe and is connected and fixed to a second end of the upper surface of the cover.

8. The bicycle carrier apparatus of claim 7, wherein a fixing bar is rotatably installed on the slide carrier, and     the fixing bar is provided with a clamp mechanism which is connected to the fixing bar and the slide pipe of the fixing slider.

9. The bicycle carrier apparatus of claim 1, wherein the extended supports are provided with a strap having a first fixed end and configured to fix a wheel of a bicycle and a fixing device for fixing a second end of the strap.

10. The bicycle carrier apparatus of claim 9, wherein fixing holes are symmetrically formed on a lower end surface of the expandable box, and the expandable box is fixedly positioned on the extended supports in a manner that the strap, which is inserted into the accommodation space of the expandable box through one of the fixing holes, passes through another of the fixing holes and is fixed to the fixing device.

11. The bicycle carrier apparatus of claim 10, wherein a support bar is provided between the symmetrical fixing holes on the lower end surface of the expandable box, and the strap that is inserted into the fixing hole surrounds the support bar.

\* \* \* \* \*